(12) United States Patent
Braad

(10) Patent No.: US 6,360,781 B1
(45) Date of Patent: Mar. 26, 2002

(54) ASSEMBLY OF A FLEXIBLE PIPE AND AN END-FITTING

(75) Inventor: Poul Erik Braad, Birkerod (DK)

(73) Assignee: NKT Flexibles A/S, Brondby (DK)

( * ) Notice: Subject to any disclaimer, the term of this patent is extended or adjusted under 35 U.S.C. 154(b) by 0 days.

(21) Appl. No.: 09/529,593
(22) PCT Filed: Oct. 14, 1997
(86) PCT No.: PCT/DK97/00452
  § 371 Date: Jun. 30, 2000
  § 102(e) Date: Jun. 30, 2000
(87) PCT Pub. No.: WO99/19656
  PCT Pub. Date: Apr. 22, 1999
(51) Int. Cl.[7] ................................................ F16L 11/16
(52) U.S. Cl. ........................ 138/109; 138/131; 138/135; 285/222.1; 285/334.1
(58) Field of Search ................................. 138/109, 131, 138/135; 285/222.1, 334.1, 334.5

(56) References Cited

U.S. PATENT DOCUMENTS

| 816,596 | A | * | 4/1906 | Perzoff | 138/131 |
| 910,104 | A | * | 1/1909 | Witzenmann | 138/131 |
| 956,077 | A | * | 4/1910 | Greenfield | 138/135 |
| 959,187 | A | | 5/1910 | Witzenmann | |
| 984,856 | A | * | 2/1911 | Schoen | 138/139 |
| 2,074,425 | A | * | 3/1937 | Pickard et al. | |
| 4,063,757 | A | * | 12/1977 | Führmann | 285/334.1 |
| 4,086,665 | A | * | 5/1978 | Poirier | 138/109 |
| 4,907,830 | A | * | 3/1990 | Sasa et al. | |
| 5,845,946 | A | * | 12/1998 | Thomas | |
| 6,039,083 | A | * | 3/2000 | Loper | 138/135 |

FOREIGN PATENT DOCUMENTS

| DE | 1032987 | 6/1958 |
| DE | 2357047 | 5/1974 |
| DE | 2366584 | 5/1974 |
| FR | 863 470 | 4/1941 |
| FR | 1 094 387 | 5/1955 |
| FR | 67 525 | 3/1958 |

* cited by examiner

Primary Examiner—James Hook
(74) Attorney, Agent, or Firm—McCormick, Paulding & Huber LLP

(57) ABSTRACT

An assembly of an end-fitting (9), having an axial extending through opening (14), with a flexible pressure pipe (1) which is of a non-bonded structure comprising a number of layers (2, 3, 4, 5, 7) including an inner carcass (2) of an interlocking structure made from metallic strips (23) forming a screwthread, an end part of which extends, in the assembled condition, into the through opening (14). The assembly comprises an annular holding groove (28) which is formed in the wall of the through opening (14), and a lock nut (15). The metallic strips (23) form a thread (24) with windings (25). When the pipe (1) is to be assembled with the end-fitting (9) the carcass (2) is exposed by initially removing the layers (3, 4, 5, 7) surrounding the carcass (2) at the end of the pipe (1), whereafter the lock nut (15) is screwed on to the end of the carcass. Finally the carcass (2) is inserted into the through opening (14) with the lock nut (15) placed in the holding groove (28) formed in the wall of the through opening (14). In some applications the lock nut (15) can also be embedded in a casting material (not shown), e.g. epoxy, for fixing the lock nut firmly in the holding groove. The joint between the carcass (2) of the flexible pressure pipe (1) and the end-fitting (9) is a simple and cheap structure and provides a greater resistance to axial tensile loads acting on the carcass (2) and against unwinding than has been known before.

10 Claims, 3 Drawing Sheets

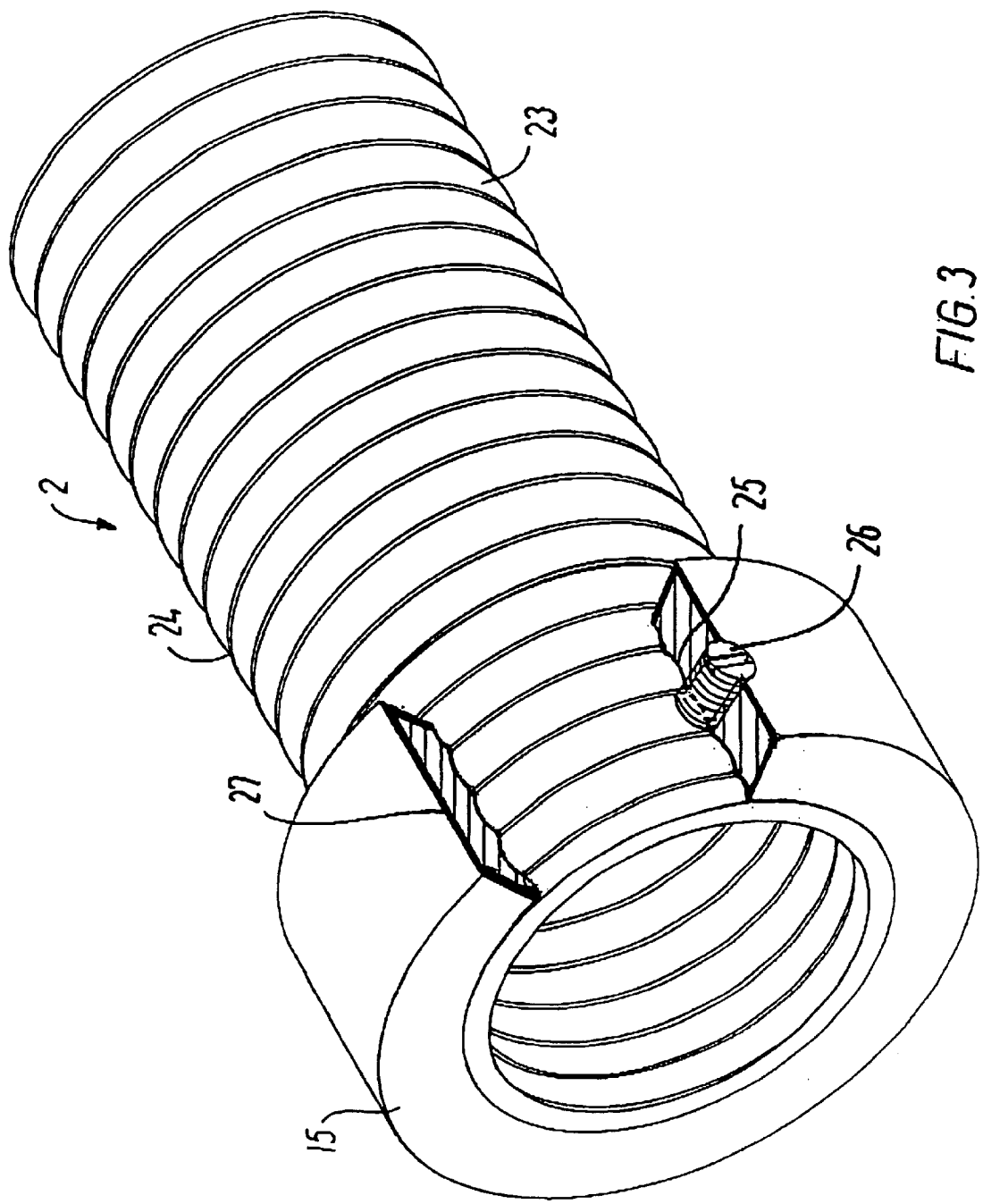

ASSEMBLY OF A FLEXIBLE PIPE AND AN END-FITTING

BACKGROUND ART

The invention concerns an assembly of an end-fitting, having an axially extending through opening, with a flexible pressure pipe which is of a non-bonded structure comprising a number of layers including an inner carcass of an interlocking structure made from metallic strips forming a screw thread, the end part of which extends, in the assembled condition, into the through opening.

Flexible pressure pipes are used in a variety of applications, including water supply lines, sewage lines and lines for transporting chemicals such as liquid ammonia and phosphoric acid and also high pressure offshore flexible pipes for the oil and gas industry.

The joint between the carcass and the end-fitting must be able to resist the axial tensile load acting on the carcass, when the flexible pipe is descending over a great length. As the carcass is of an interlocking structure of a type which allows a mutual screwing movement of the windings of the metallic strips, the joint moreover must prevent the carcass from becoming unwound.

Conventionally, such a joint is provided by screw shaped ribs which, during the extrusion of an inner lining of a plastic material around the carcass, are pressed into the grooves between the windings such that the carcass is secured by the lining which again is secured by the end-fitting. Owing to the notch sensitivity of the lining caused by this construction, the lining is, however, inclined to crack.

This tendency is especially dangerous because temperature stresses can arise in the joint between the lining and the carcass, because the plastic material of the lining has a much higher coefficient of expansion than the material of the carcass, which could be of e.g. stainless steel.

SUMMARY OF THE INVENTION

The object of the invention is to provide an assembly of the type mentioned in the opening paragraph in which the joint between the carcass and the end-fitting is a simple and cheap structure and provides a greater resistance to axial tensile loads acting on the carcass and against unwinding of the carcass than has been known before.

This is achieved in that the assembly comprises an annular holding groove which is formed in the wall of the through opening, and a lock nut which is screwed on the screwthread-formed strips of the end part of the carcass and fitted into the holding groove. In this construction the joint between the carcass and the end-fitting is independent of the inner lining which moreover can be made with optimal strength. When fixed in the holding groove, the lock nut also prevents the carcass from becoming unwound.

By interposing a galvanic insulation material having a high electrical resistance between the lock nut and the end-fitting, an electric potential, which could cause galvanic corrosion, can be prevented from arising between said parts.

The galvanic insulation material may advantageously be PTFE, preferably containing some solid insulation material for improving the pressure strength and the form stability of the material.

In a simple and cheap embodiment, the galvanic insulation material can be in the form of an annular disc placed on each side of the lock nut. In a particularly expedient embodiment, the lock nut can also be coated with the galvanic insulation material or totally manufactured from it.

The lock nut itself can be locked to the carcass by e.g. welding which, however, is time consuming and strenuous work and involves the risk that some of the plastic material of the pipe may be harmed by the heat generated by the welding process.

The lock nut can, however, in a very simple way be locked to the carcass by screwing a screw radially into the lock nut and against the carcass. This screw can advantageously be used to rotate the lock nut and thereby tighten the carcass when the windings of this have been to some extent unwound.

For fixing the lock nut firmly in the holding groove of the end-fitting, the lock nut can be embedded in a casting material, e.g. epoxy.

The invention also concerns a method for assembling an end-fitting, having an axially extending through opening, with a flexible pressure pipe which is of a non-bonded structure comprising of a number of layers including an inner carcass of an interlocking structure made from metallic strips forming a screw thread, an end part of which extends, in assembled condition, into the through opening. The method comprises removing the layers surrounding the carcass at the end of the pipe, screwing a lock nut on the screwthread-form strips of the end part of the carcass, and placing the lock nut in a holding groove formed in the wall of the through opening. This method can be performed in a quick and time efficient manner in situ.

BRIEF DESCRIPTION OF THE DRAWINGS

The invention will be explained more fully by the following description, given by way of example, with reference to the drawings, in which:

FIG. 3 is a perspective view on an enlarged scale of a fragment of a lock nut mounted on an carcass of the flexible pipe shown in FIG. 1.

DETAILED DESCRIPTION OF PREFERRED EMBODIMENTS

Figure 1:
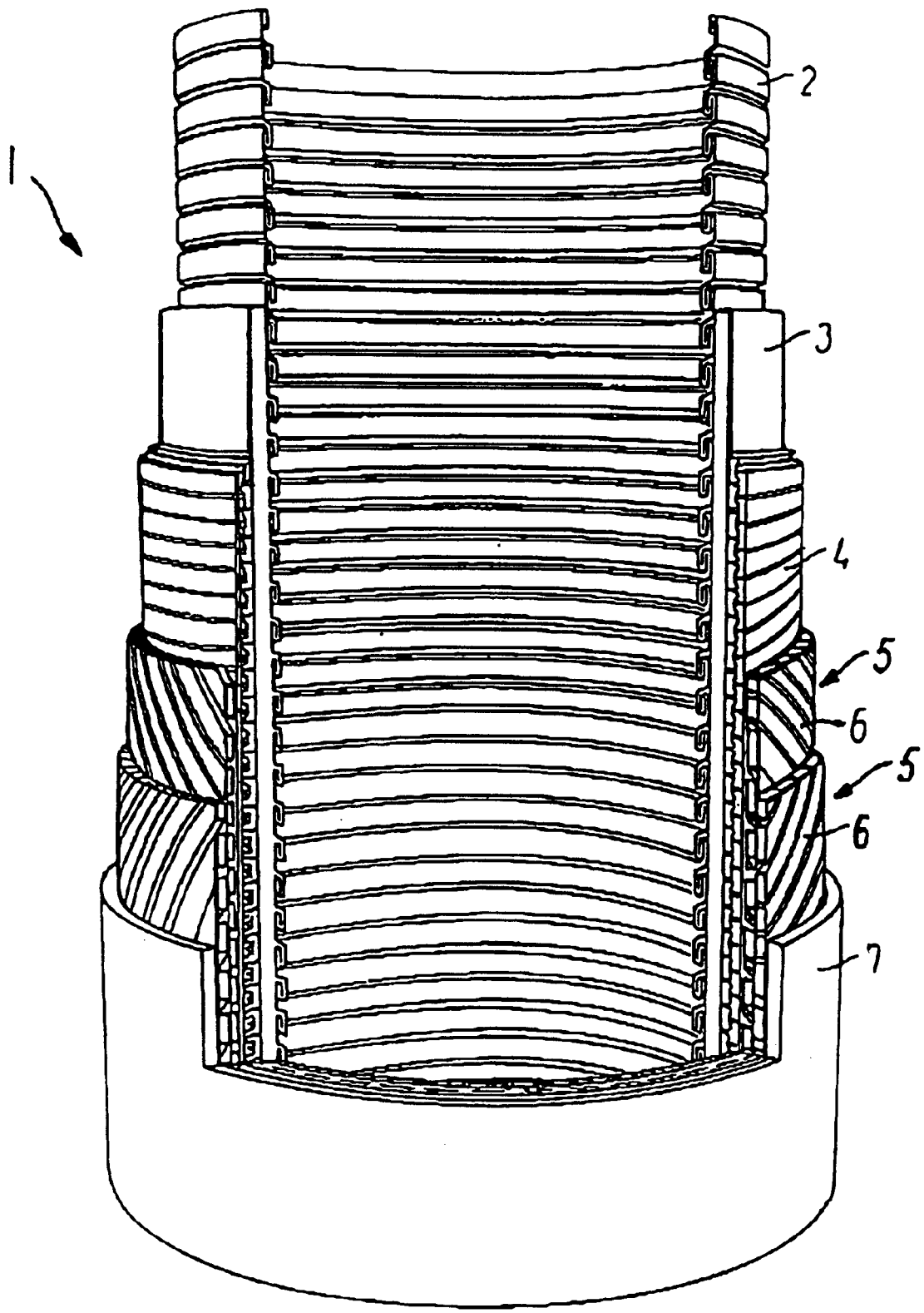
FIG. 1 shows, partly in axial section, a typical flexible pressure pipe.

FIG. 1 shows a flexible pressure pipe, which is generally designated by 1. The pipe is of a non-bonded structure comprising a number of layers which in this embodiment are:

- a carcass 2 of an interlocking structure made from metallic strips. The carcass serves, in the main, to prevent collapse of the pipe due to pipe decompression, external pressure, tensile armour pressure and mechanical crushing loads,
- an inner lining 3 in the form of an extruded polymer layer for providing internal fluid integrity,
- a pressure armour 4 in the form of structural layers consisting of helically wound C-shaped metallic strips with a high lay angle,
- a tensile armour 5 consisting of a pair of helically counter wound flat metallic tensile wires 6 with a lay angle typically between 20° and 60°. The tensile armour serves to provide resistance to axial tensile loads, and
- an outer sheath 7 in the form of an extruded polymer for shielding the structural elements of the pipe from the outer environment and providing mechanical protection.

Figure 2:
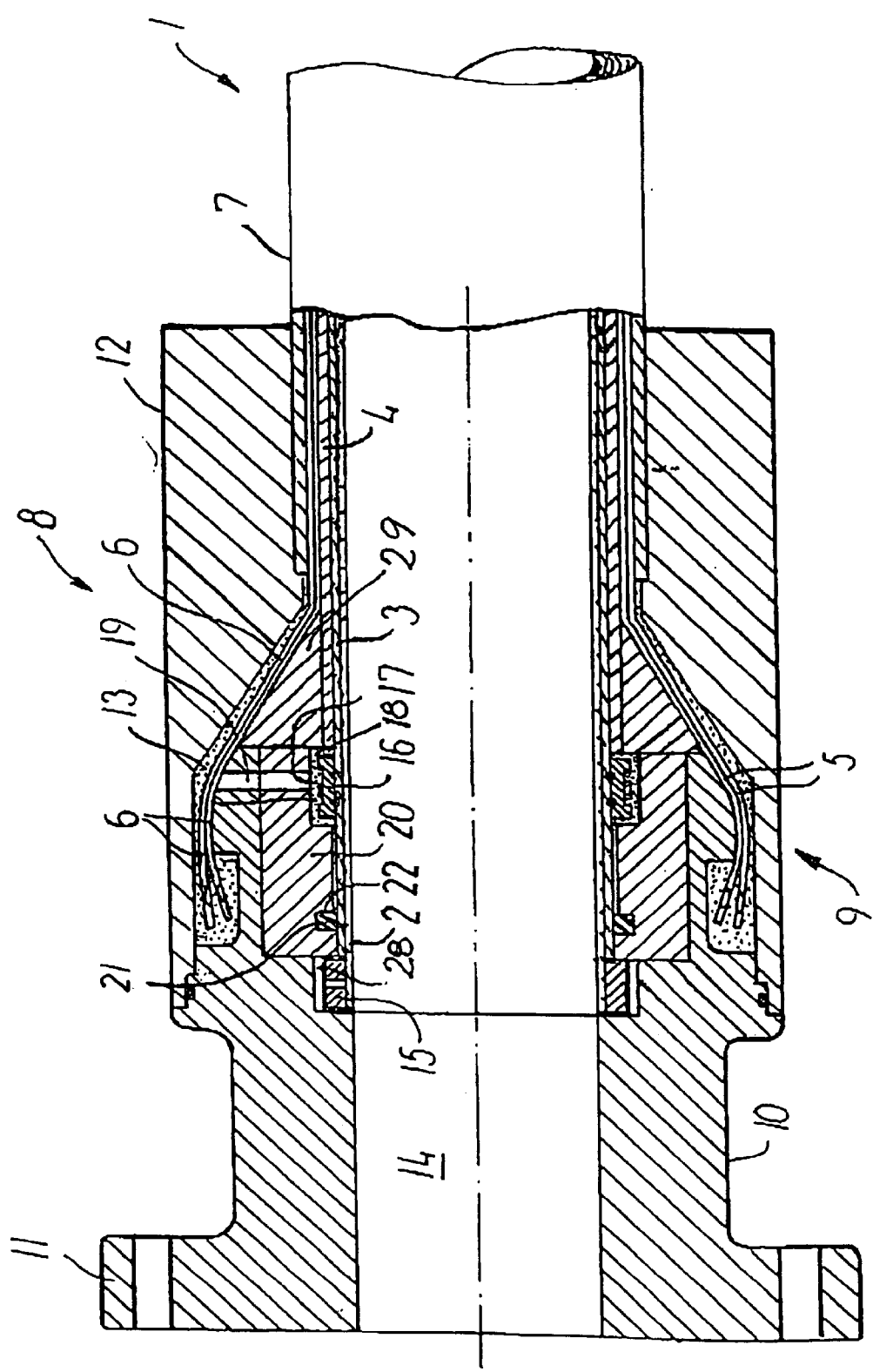
FIG. 2 shows, in axial section, an assembly of the flexible pressure pipe shown in FIG. 1 and an end-fitting.

FIG. 2 shows an assembly 8 of an end-fitting 9 and the flexible pressure pipe 1. The end-fitting 9 forms the transition between the pipe and the connector and for this purpose has a first part 10 with a connection flange 11, a second part 12 and a third part 29. The three parts 10; 12; 29 delimit a cavity 13 which partly is substantially cone-shaped. The end-fitting 9 has furthermore a through opening 14 for accommodating an end of the pipe 1.

When assembling the flexible pressure pipe 1 with the end-fitting 9 the flat metallic wires 6 of the tensile armour 5 are led into the cavity 13 in the end-fitting and a casting material, e.g. epoxy, is injected into the cavity making an anchoring for the wires.

The carcass 2 is fastened to the end-fitting 9 by means of a lock nut 15, and to the inner lining 3 by means of a lock ring 16 fitting into an annular groove 17 in the wall of the through opening 14. The lock ring 16 is in the embodiment shown secured in the groove 17 by a casting material 18, e.g. epoxy, which is injected through a hole 19.

A ring 20 provides a stop for the lock nut 15. In the embodiment shown a sealing ring 21 for tightening the end-fitting 9 and the inner lining 3 is fitted into a groove 22 in the ring 20.

As best seen in FIG. 3 the carcass consists of helically wound metallic strips 23 forming a screwthread 24 with windings 25.

After having removed the layers 3, 4, 5, 7 surrounding the carcass 2 at the end of the pipe, the lock nut 15 simply is screwed on to the end of the carcass whereafter said end is inserted into the through opening 14 of the end-fitting 9, with the lock nut 15 placed in a annular holding groove 28 formed in the wall of the through opening.

For some applications the lock nut 15 can also be embedded in a casting material (not shown), e.g. epoxy, for fixing the lock nut firmly in the holding groove of the end-fitting.

The lock nut 15 is locked to the carcass 2 by screwing a screw 26 radially into the lock nut and into the carcass. When the carcass has been to some extent unwound, this screw can be used for rotating the lock nut such that the windings 25 of the carcass 2 are tightened up.

Between the lock nut and the end-fitting a galvanic potential could possibly arise. The surface of the lock nut 15 therefore has a coating 27 of a galvanic insulation material, e.g. PTFE, for preventing corrosion of the two parts which could be caused by such a potential. The insulating material may include solid insulation material for improving the pressure strength of the material.

In the embodiment shown, the lock nut is coated with the insulating material, but the lock nut can in another embodiment (not shown) consist totally of this material.

The insulating material can also simply be in the form of annular discs (not shown) placed on each side of the lock nut.

Having thus provided a general discussion, and specific illustrations by way of examples, it is to be understood that no undue restrictions are to be imposed by reason thereof. Many other embodiments are imaginable within the scope of the invention. The specific locking, according to the invention, between the carcass 2 of the flexible pressure pipe 1 and the end-fitting 9 can be used in combination with other constructions of the joint between the end-fitting 9 and the tensile armour wires 6 and the inner lining 3, respectively, in addition to those described above and shown in the figures.

What is claimed is:

1. An assembly of an end-fitting, having an axially extending through opening, with a flexible pressure pipe which is of a non-bonded structure comprising a number of layers including an inner carcass of an interlocking structure made from metallic strips forming a screwthread, an end part of which extends, in assembled condition, into the through opening wherein the assembly comprises an annular holding groove which is formed in the wall of the through opening, and a lock nut which is screwed on the screwthread-form strips of the end part of the carcass and fitted directly into the holding groove after having removed at least the immediate to the carcass situated layers in the area of the lock nut.

2. An assembly according to claim 1, wherein in that it comprises at least one screw (26), which is screwed radially into the lock nut (15) and against the carcass (2).

3. An assembly according to claim 1, wherein in that there is a gap between the lock nut (15) and the holding groove (28), and that this gap is filled with a casting material, e.g. a polymer such as epoxy.

4. An assembly according to claim 1, wherein it further comprises a galvanic insulation material which is interposed between the lock nut (15) and the end-fitting (9).

5. An assembly according to claim 4, wherein in that the galvanic insulation material is of a type having a high electrical resistance.

6. An assembly according to claim 4 or claim 5, wherein in that the galvanic insulation material is PTFE.

7. An assembly according to claim 4 or claim 5, wherein in that the galvanic insulation material is PTFE which is filled with solid insulation material.

8. An assembly according to claim 4, wherein in that the galvanic insulation material is in the form of an annular disc, placed on each side of the lock nut (15).

9. An assembly according to claim 4, wherein that the lock nut (15) is coated with or consists of the galvanic insulation material.

10. A method for assembling an end-fitting, having an axially extending through opening, with a flexible pressure pipe which is of a non-bonded structure comprising a number of layers including an inner carcass of an interlocking structure made from metallic strips forming a screwthread, an end part of which extends, in the assembled condition, into the through opening wherein the method comprises, removing the layers surrounding the carcass at an end of the pipe, screwing a lock nut on to the screwthread-form strips of the end part of the carcass, and directly placing the lock nut in a holding groove formed in the wall of the through opening.

* * * * *

UNITED STATES PATENT AND TRADEMARK OFFICE
CERTIFICATE OF CORRECTION

PATENT NO.    : 6,360,781 B1
DATED         : march 26, 2002
INVENTOR(S)   : Poul E. Braad It is certified that error appears in the above-identified patent and that said Letters Patent is hereby corrected as shown below:

<u>Title page,</u>
Item [73], the Assignee's name is hereby corrected to read "NKT Flexibles I/S".

Signed and Sealed this

Eighteenth Day of June, 2002

*Attest:*

*Attesting Officer*

JAMES E. ROGAN
*Director of the United States Patent and Trademark Office*